(12) United States Patent
Traut et al.

(10) Patent No.: US 7,299,337 B2
(45) Date of Patent: Nov. 20, 2007

(54) ENHANCED SHADOW PAGE TABLE ALGORITHMS

(76) Inventors: Eric P. Traut, 17809 SE. 58th Pl., Bellevue, WA (US) 98006; Matthew D. Hendel, 5150 S. Orchard St., Seattle, WA (US) 98118; Rene Antonio Vega, 11014 NE. 41st Dr., Kirkland, WA (US) 98033

( * ) Notice: Subject to any disclaimer, the term of this patent is extended or adjusted under 35 U.S.C. 154(b) by 183 days.

(21) Appl. No.: 11/128,665

(22) Filed: May 12, 2005

(65) Prior Publication Data

US 2006/0259732 A1 Nov. 16, 2006

(51) Int. Cl.
*G06F 9/26* (2006.01)
(52) U.S. Cl. ...................... 711/206; 711/207
(58) Field of Classification Search ............. 711/206
See application file for complete search history.

(56) References Cited

U.S. PATENT DOCUMENTS 4,456,954 A * 6/1984 Bullions et al. ............ 711/207
5,724,581 A * 3/1998 Kozakura .................... 707/202
2006/0206658 A1 * 9/2006 Hendel et al. ................. 711/6

* cited by examiner

*Primary Examiner*—Kevin L. Ellis
*Assistant Examiner*—Hamdy S Ahmed

(57) ABSTRACT

Enhanced shadow page table algorithms are presented for enhancing typical page table algorithms. In a virtual machine environment, where an operating system may be running within a partition, the operating system maintains it's own guest page tables. These page tables are not the real page tables that map to the real physical memory. Instead, the memory is mapped by shadow page tables maintained by a virtualing program, such as a hypervisor, that virtualizes the partition containing the operating system. Enhanced shadow page table algorithms provide efficient ways to harmonize the shadow page tables and the guest page tables. Specifically, by using tagged translation lookaside buffers, batched shadow page table population, lazy flags, and cross-processor shoot downs, the algorithms make sure that changes in the guest pages tables are reflected in the shadow page tables.

20 Claims, 16 Drawing Sheets

Guest Page Table 702

| ☐ Accessed; ☐ Modified PFN 100 |
| --- |
| ☐ Accessed; ☐ Modified PFN 101 |
| ☐ Accessed; ☐ Modified PFN 102 |
| ☐ Accessed; ☐ Modified PFN 103 |
| ⋮ |
| ☐ Accessed; ☐ Modified PFN 201 |
| ☐ Accessed; ☐ Modified PFN 202 |
| ☐ Accessed; ☐ Modified PFN 203 |
| ☐ Accessed; ☐ Modified PFN 204 |

Shadow Page Table 704

| ☐ Accessed; ☐ Modified PFN 100 |
| --- |
| ☑ Accessed; ☑ Modified PFN 101 |
| ☑ Accessed; ☐ Modified PFN 102 |
| ☑ Accessed; ☑ Modified PFN 103 |
| ⋮ |
| ☑ Accessed; ☐ Modified PFN 201 |
| ☑ Accessed; ☑ Modified PFN 202 |
| ☑ Accessed; ☑ Modified PFN 203 |
| ☑ Accessed; ☑ Modified PFN 204 |

Fig. 7A

Guest Page Table 702

- ☐ Accessed; ☐ Modified
  PFN 100
- ☑ Accessed; ☑ Modified
  PFN 101
- ☑ Accessed; ☐ Modified
  PFN 102
- ☑ Accessed; ☑ Modified
  PFN 103

⋮

- ☑ Accessed; ☐ Modified
  PFN 201
- ☑ Accessed; ☑ Modified
  PFN 202
- ☑ Accessed; ☑ Modified
  PFN 203
- ☑ Accessed; ☑ Modified
  PFN 204

Shadow Page Table 704

- ☐ Accessed; ☐ Modified
  PFN 100
- ☑ Accessed; ☑ Modified
  PFN 101
- ☑ Accessed; ☐ Modified
  PFN 102
- ☑ Accessed; ☑ Modified
  PFN 103

⋮

- ☑ Accessed; ☐ Modified
  PFN 201
- ☑ Accessed; ☑ Modified
  PFN 202
- ☑ Accessed; ☑ Modified
  PFN 203
- ☑ Accessed; ☑ Modified
  PFN 204

⟵ Synchronization 706

Fig. 7B

ENHANCED SHADOW PAGE TABLE ALGORITHMS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright© 2005, Microsoft Corp.

FIELD OF THE INVENTION

The present invention generally relates to the field of virtual machines and to operating systems that execute in virtual machine environments. More specifically, the present invention is directed to systems and methods for enhancing shadow page table algorithms in such virtual machine environments.

BACKGROUND OF THE INVENTION

In a hypervisor environment, where physical memory access is controlled by the hypervisor instead of an operating system running on top of the hypervisor, the performance of memory access algorithms contribute significantly to the overall performance of the system.

In a shadow page table environment, the page tables that the operating system operates on are not the real page tables that the machine uses. Instead, access to the page directory root (e.g. the CR3 register on an IA32 system or an AMD64 system that points to a page table) is kept private to the hypervisor, and the operating system's page directory root is virtualized. The hypervisor virtualizes load and store operations to the page directory root, so that the operating system appears to be running atop real hardware. The hypervisor-private page table is called the shadow page table. Conversely, the operating system page table is called the guest page table. When the operating system modifies its guest page table entries, the shadow page table entries must also be modified to correspond to the operating system's modifications.

In order to improve virtual-to-physical translations, translation lookaside buffers (TLBs), which are stored on CPUs, are used as caches. Thus, instead of looking up translations in a page table, an operating system can employ the much faster TLB translations. However, such TLBs are very limited in storage, typically containing 128 to 256 entries, so only the most recent and relevant translations are kept in them.

On several popular processor architectures, for example, the Intel IA 32 or the x86 or the AMD x64 architecture, the entire TLB cache is discarded when an address space is changed, i.e., when an assignment is made to the page directory root. The reason for this is that the new address space (the switched to address space) gets to use the TLB since it is active and the old address space (the switched from address space) does not since it is not active anymore. Upon such address space switch, shadow page tables are also typically discarded. When a shadow page table is discarded, repopulating it with new translation entries is very costly in terms of processor cycles. Thus, it is advantageous to reduce the high cost associated with populating a shadow page table. Or, put another way, it would be advantageous to reduce the high cost associated with discarding an entire shadow page table when an address space change occurs.

Next, to perform efficient paging algorithms, current processors frequently implement mechanisms to determine if a page has been accessed (i.e. whether it has been read) or modified (i.e. whether it has been written to). In most implementations, two flags are maintained in a page table entry: a flag that is set when a page is accessed and a separate flag that is set when a page is modified (the modified flag is often called the dirty flag).

In a shadow page table implementation, these accessed and modified flags will be set in the shadow page table, which is invisible to the operating system. For the proper functioning of many operating systems, these accessed and modified flags must be correctly maintained. In most processor architectures, it is impossible to transparently maintain consistency between the accessed and modified flags in the shadow page table and the accessed and modified flags in the guest page table.

To correctly maintain the accessed flags, shadow page table algorithms must examine the guest page table's accessed flag. If a guest entry's accessed flag is cleared, the corresponding entry within the shadow page table must be marked as invalid. When the guest accesses this page, the hypervisor receives control and marks the page as valid in the shadow page table and accessed in the operating system's guest page table.

Similarly, to correctly maintain the modified flags, a shadow page table implementation must mark a page as read-only, then process the page fault interrupt when an attempt is made to write to the page. Within the interrupt, the shadow page must be marked as writable and the guest page table entry must be marked as modified. Processing these interrupts to maintain the active and modified flags of page table entries is a significant source of slowdown for a shadow page table implementation. Thus, it would be advantageous to reduce the high cost of maintaining accessed and modified flags in the operating system's guest page table entries.

Finally, on a multiprocessor system, when a page table entry is modified, the page table entry must be purged not only from the TLB of the processor that modified the entry, but from the TLB of any processor that may have a cached copy of the table entry. In some processor architectures, this cross-processor TLB invalidation is performed explicitly by software using an inter-process interrupt. This cross-processor TLB invalidation is often referred to as a TLB shoot down. TLB shoot down algorithms are very expensive in terms of processor cycles—especially in a virtualized environment. In particular, the current TLB shoot down algorithms require many transitions into the hypervisor to accomplish their task, and require more inter-processor interrupts than may otherwise be required. Thus, it would be advantageous to reduce the high cost of TLB shoot down in a hypervisor (or an equivalent virtualizing program).

SUMMARY OF THE INVENTION

Enhanced shadow page table algorithms are provided in various aspects of the invention in order to increase the efficiency of typical shadow table routines. In a typical virtual machine environment, a virtualizing program, such as a hypervisor, maintains partitions that may each contain an operating system. The operating system maintains its own guest page tables that map virtual addresses to guest physical addresses. The hypervisor also maintains its own shadow page tables that maps virtual addresses to system physical addresses. Thus, in one aspect of the invention, virtual tagged lookaside buffers (TLBs) are used in order to retain shadow page tables when an operating system switches address spaces by shifting from one guest page table to another guest page table, and hence from one shadow page table to another shadow page table.

In other aspects of the invention, batched shadow page table algorithms are presented. Instead of populating just one shadow page table entry upon populating a guest page table, multiple shadow page table entries are populated, thus decreasing hypervisor processing of any subsequent shadow page table entries, hence increasing the efficiency of a virtual machine environment. In yet other aspects of the invention, shadow page table algorithms lazily update accessed and modified flags within the guest page tables to reflect such modified flags set by processors in shadow page tables. Lazy updating uses synchronization commands by a partition operating system to update such guest page tables when it is desired to do so, not upon each setting of the flags in shadow page tables. In still other aspects of the invention, translation lookaside buffer management routines are provided by the virtualizing program in order to perform more efficient inter-processor shoot down. Thus, when multiple TLBs need to be purged, they can be purged by a single hypervisor call. This kind of TLB updating applies not only to the physical TLBs located on physical processors but also in shadow page tables that are embodied by a virtual tagged TLB. Various other aspects also consider a shadow-page-table-per-virtual-processor and a shadow-page-table-per-virtual-machine modes.

Other features of the invention are described below.

BRIEF DESCRIPTION OF THE DRAWINGS

The foregoing summary, as well as the following detailed description of the invention, is better understood when read in conjunction with the appended drawings. In order to illustrate the invention, various aspects of the invention are shown. However, the invention is not limited to the specific systems and methods disclosed. The following figures are included:

FIG. 7A illustrates lazy accessed and modified flag propagation prior to synchronization commands;

FIG. 7B illustrates lazy accessed and modified flag propagation after synchronization commands;

DETAILED DESCRIPTION OF ILLUSTRATIVE ASPECTS OF THE INVENTION

Overview

Enhanced shadow page table algorithms are disclosed herein. At first, an exemplary computing environment is presented followed by an exemplary virtual machine environment. Next, a detailed discussion of particular aspects of shadow page table algorithms operating in such a virtual machine environment are presented. For example, the following aspects are considered: tagged virtual TLBs that allow for multiple shadow page tables upon address space switches; batched population of such shadow page tables, in lieu of single style population; flag synchronization between shadow page tables and guest page tables; and TLBs and virtual TLBs embodied in shadow page tables that are flushed across a plurality of processors when guest page table entries are modified. These are just a few exemplary aspects discussed below in further detail. Other aspects are also presented.

Exemplary Computing Environment

Figure 1:
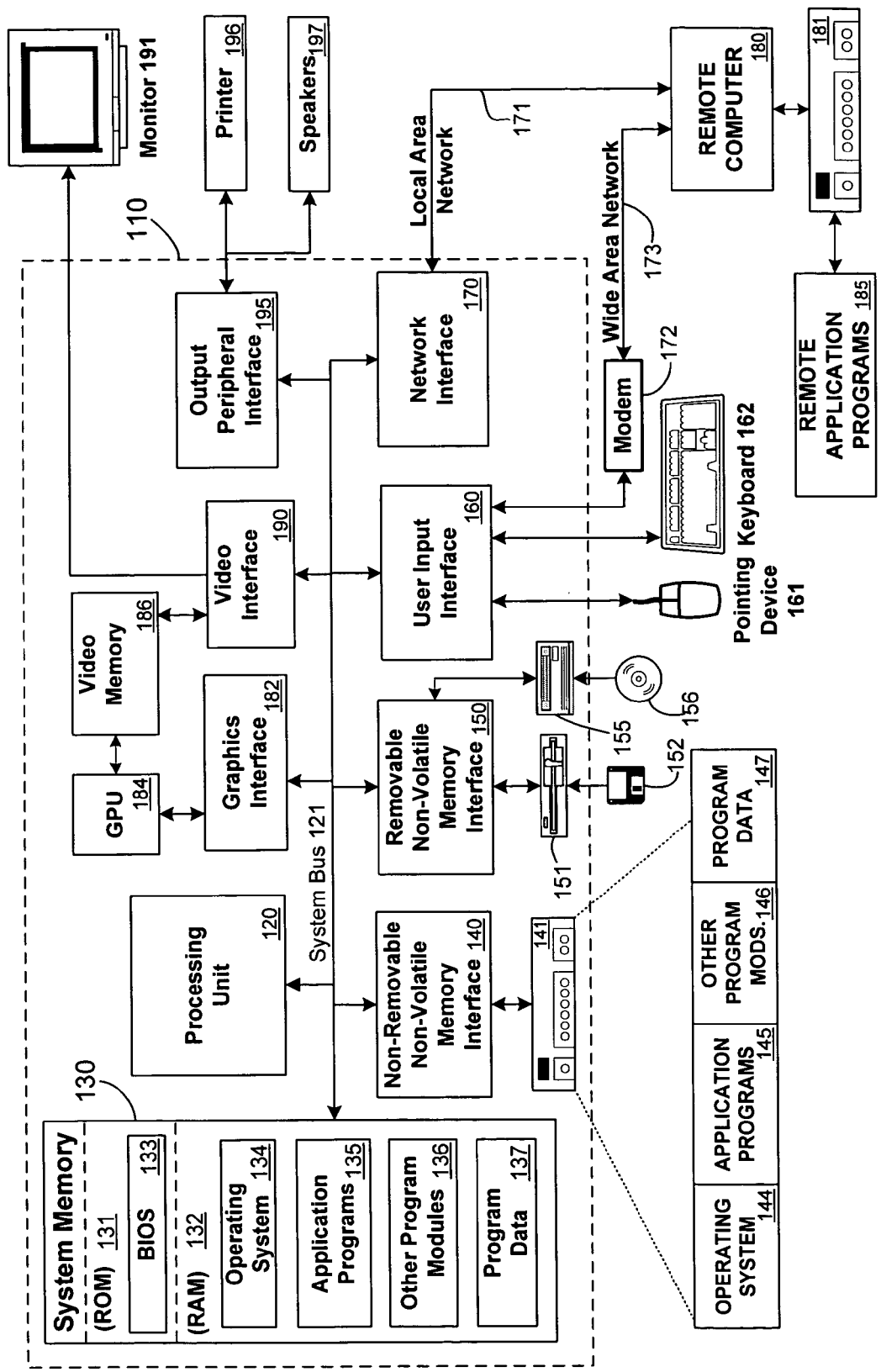
FIG. 1 provides a brief general description of a suitable computing device in connection with which the invention may be implemented.

FIG. 1 and the following discussion are intended to provide a brief general description of a suitable computing device in connection with which the invention may be implemented. For example, any of the client and server computers or devices illustrated in FIG. 1 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Virtual Machines

Figure 2:
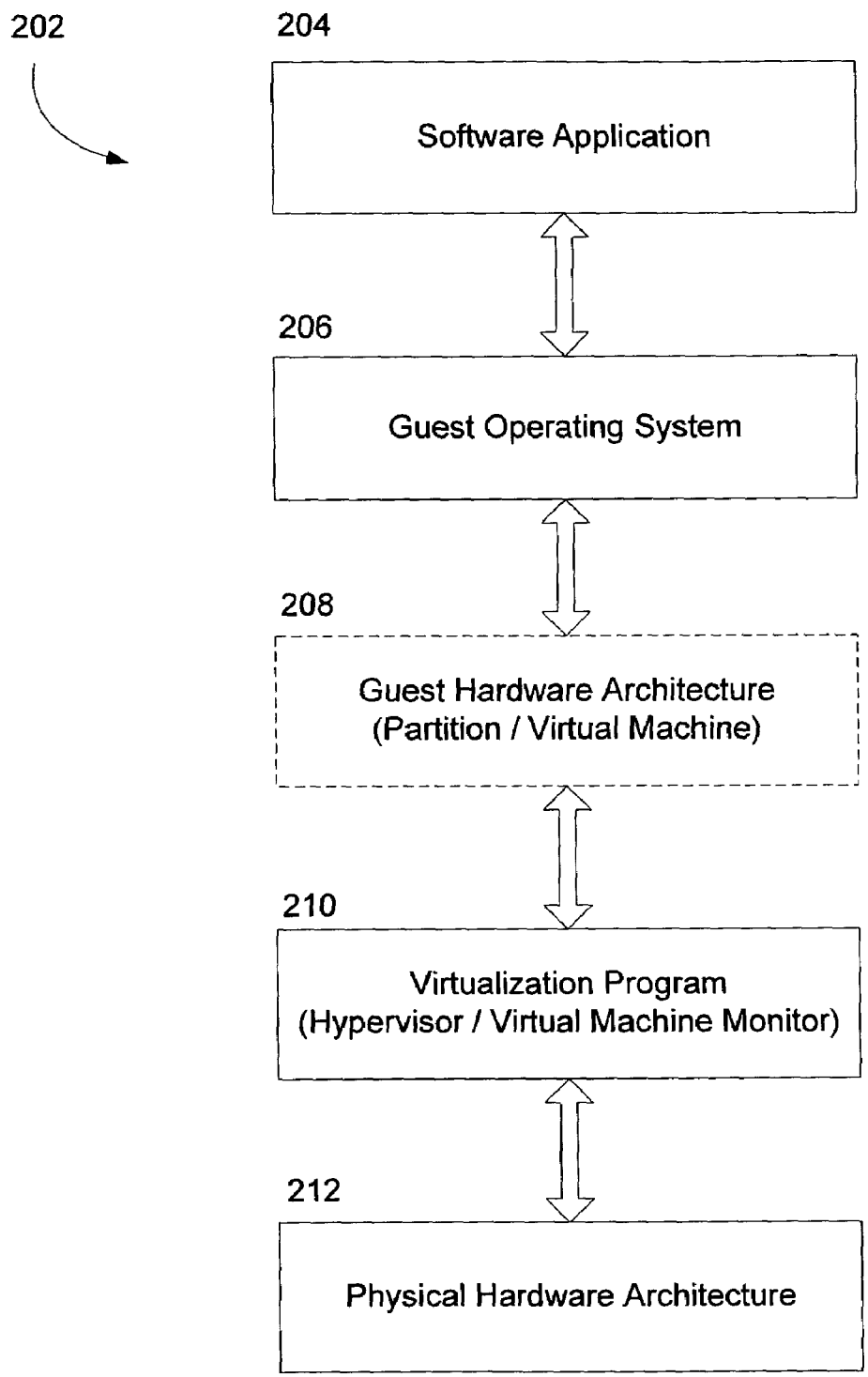
FIG. 2 is a block diagram representing the logical layering of the hardware and software architecture for an emulated operating environment in a computer system.

FIG. 2 is a diagram representing the logical layering of the hardware and software architecture for a virtualized environment in a computer system. In the figure, a virtualization program 210 runs directly or indirectly on the physical hardware architecture 212. The virtualization program 210 may be (a) a virtual machine monitor that runs alongside a host operating system or a host operating system with a hypervisor component wherein the hypervisor component performs the virtualization. The virtualization program 210 virtualizes a guest hardware architecture 208 (shown as dashed lines to illustrate the fact that this component is a partition or a "virtual machine"), that is, hardware that does not actually exist but is instead virtualized by the virtualizing program 210. A guest operating system 206 executes on the guest hardware architecture 208, and a software application 204 runs on the guest operating system 206. In the virtualized operating environment of FIG. 2, the software application 204 can run in a computer system 202 even if the software application 204 is designed to run on an operating system that is generally incompatible with a host operating system and the hardware architecture 212.

Figure 3A:
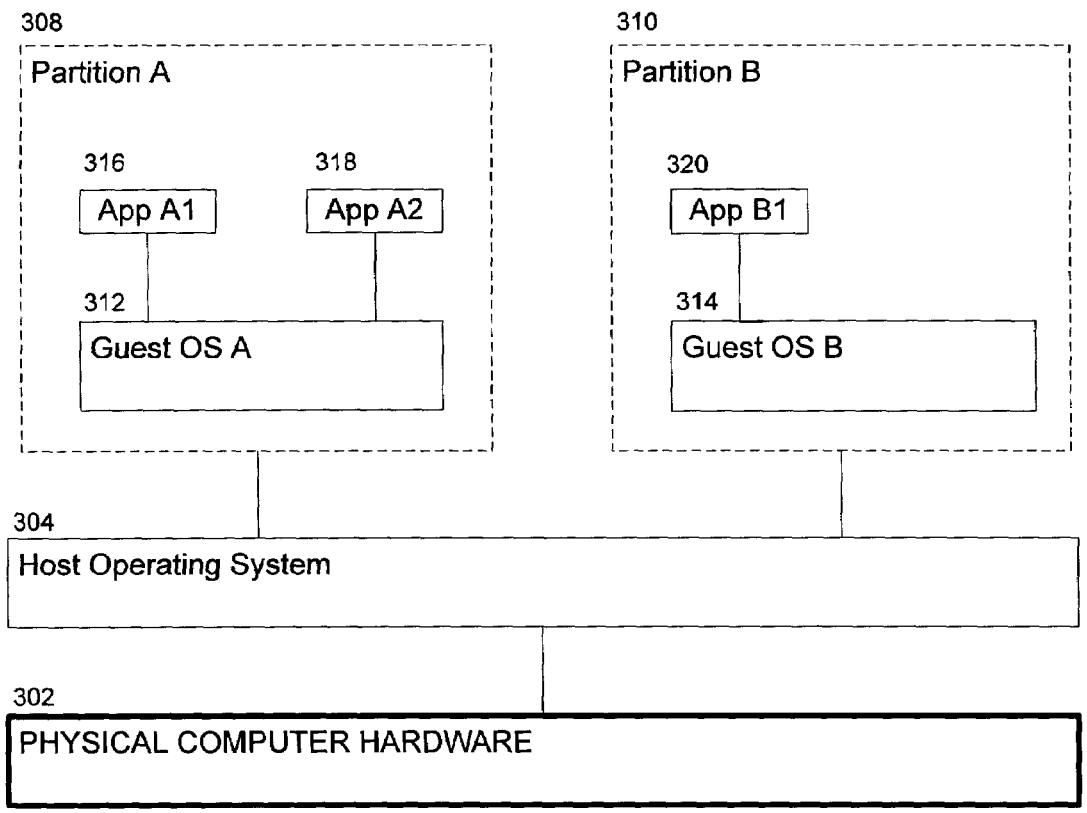
FIG. 3A is a block diagram representing a virtualized computing system wherein the emulation is performed by the host operating system (either directly or via a hypervisor)

FIG. 3A illustrates a virtualized computing system comprising a host operating system (host OS) software layer 304 running directly above physical computer hardware 302, where the host OS 304 provides access to the resources of the physical computer hardware 302 by exposing interfaces to partitions A 308 and B 310 for the use by operating systems 312 and 314, respectively. This enables the host OS 304 to go unnoticed by operating system layers 312 and 314 running above it. Again, to perform the virtualization, the host OS 304 may be a specially designed operating system with native virtualization capabilities or, alternately, it may be a standard operating system with an incorporated hypervisor component for performing the virtualization (not shown).

Referring again to FIG. 3A, above the host OS 304 are two partitions, partition A 308, which may be, for example, a virtualized Intel 386 processor, and partition B 310, which may be, for example, a virtualized version of one of the Motorola 680X0 family of processors. Within each partition 308 and 310 are guest operating systems (guest OSs) A 312 and B 314, respectively. Running on top of guest OS A 312 are two applications, application A1 316 and application A2 318, and running on top of guest OS B 314 is application B1 320.

In regard to FIG. 3A, it is important to note that partition A 308 and partition B 314 (which are shown in dashed lines) are virtualized computer hardware representations that exist only as software constructions. They are made possible due to the execution of specialized virtualization software(s) that not only presents partition A 308 and partition B 310 to Guest OS A 312 and Guest OS B 314, respectively, but which also performs all of the software steps necessary for Guest OS A 312 and Guest OS B 314 to indirectly interact with the real physical computer hardware 302.

Figure 3B:
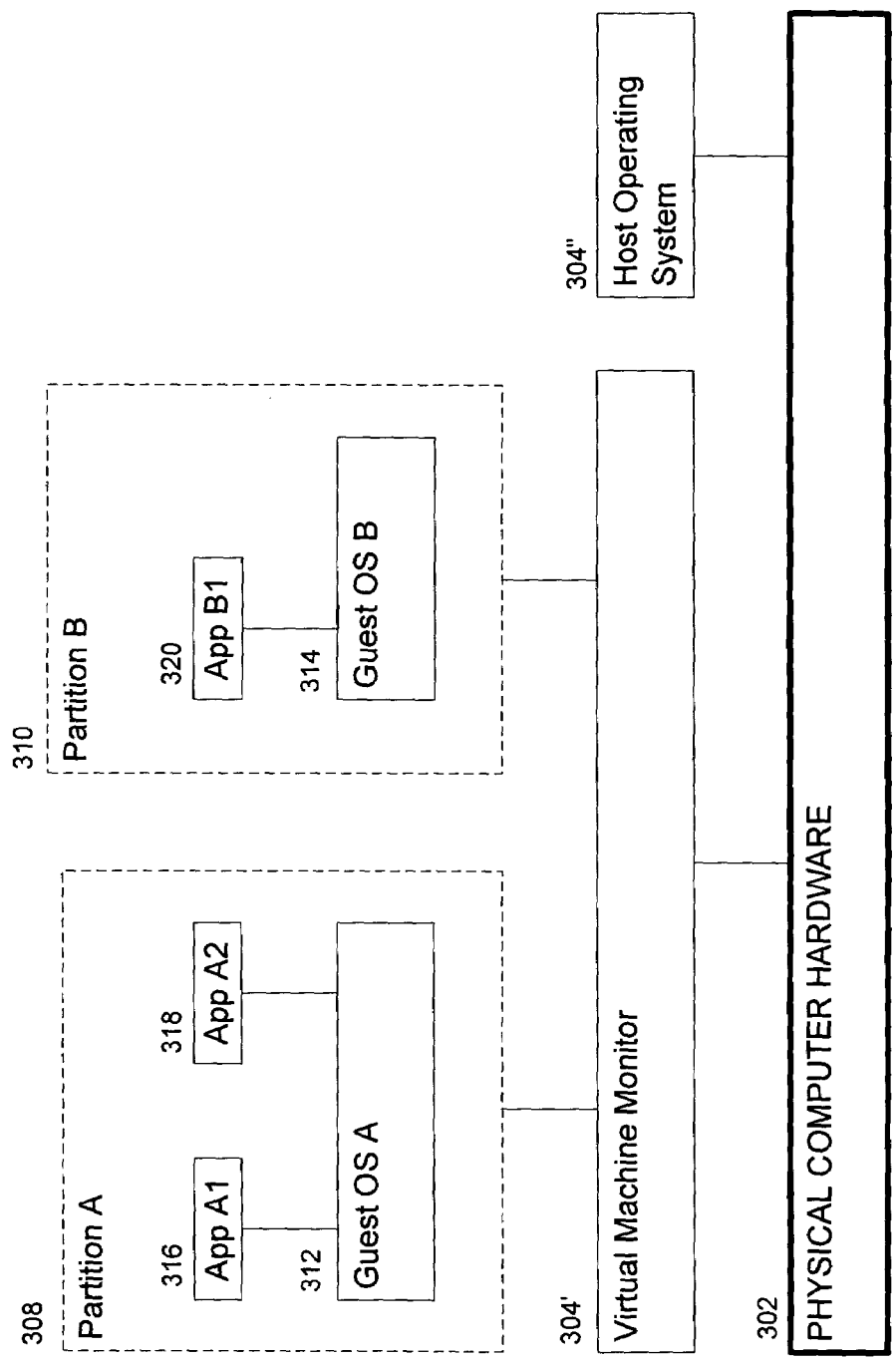
FIG. 3B is a block diagram representing an alternative virtualized computing system wherein the emulation is performed by a virtual machine monitor running side-by-side with a host operating system.

FIG. 3B illustrates an alternative virtualized computing system wherein the virtualization is performed by a virtual machine monitor (VMM) 304' running alongside the host operating system 304". In certain cases, the VMM 304' may be an application running above the host operating system 304" and interacting with the computer hardware 302 only through the host operating system 304". In other cases, as shown in FIG. 3B, the VMM 304' may instead comprise a partially independent software system that on some levels interacts indirectly with the computer hardware 302 via the host operating system 304" but on other levels the VMM 304' interacts directly with the computer hardware 302 (similar to the way the host operating system interacts directly with the computer hardware). And yet in other cases, the VMM 304' may comprise a fully independent software system that on all levels interacts directly with the computer hardware 302 (similar to the way the host operating system interacts directly with the computer hardware) without utilizing the host operating system 304" (although still interacting with the host operating system 304" in order to coordinate use of the computer hardware 302 and avoid conflicts and the like).

All of these variations for implementing the above mentioned partitions are just exemplary implementations, and nothing herein should be interpreted as limiting the invention to any particular virtualization aspect.

Aspects of Enhanced Shadow Page Table Algorithms

Figure 4A:
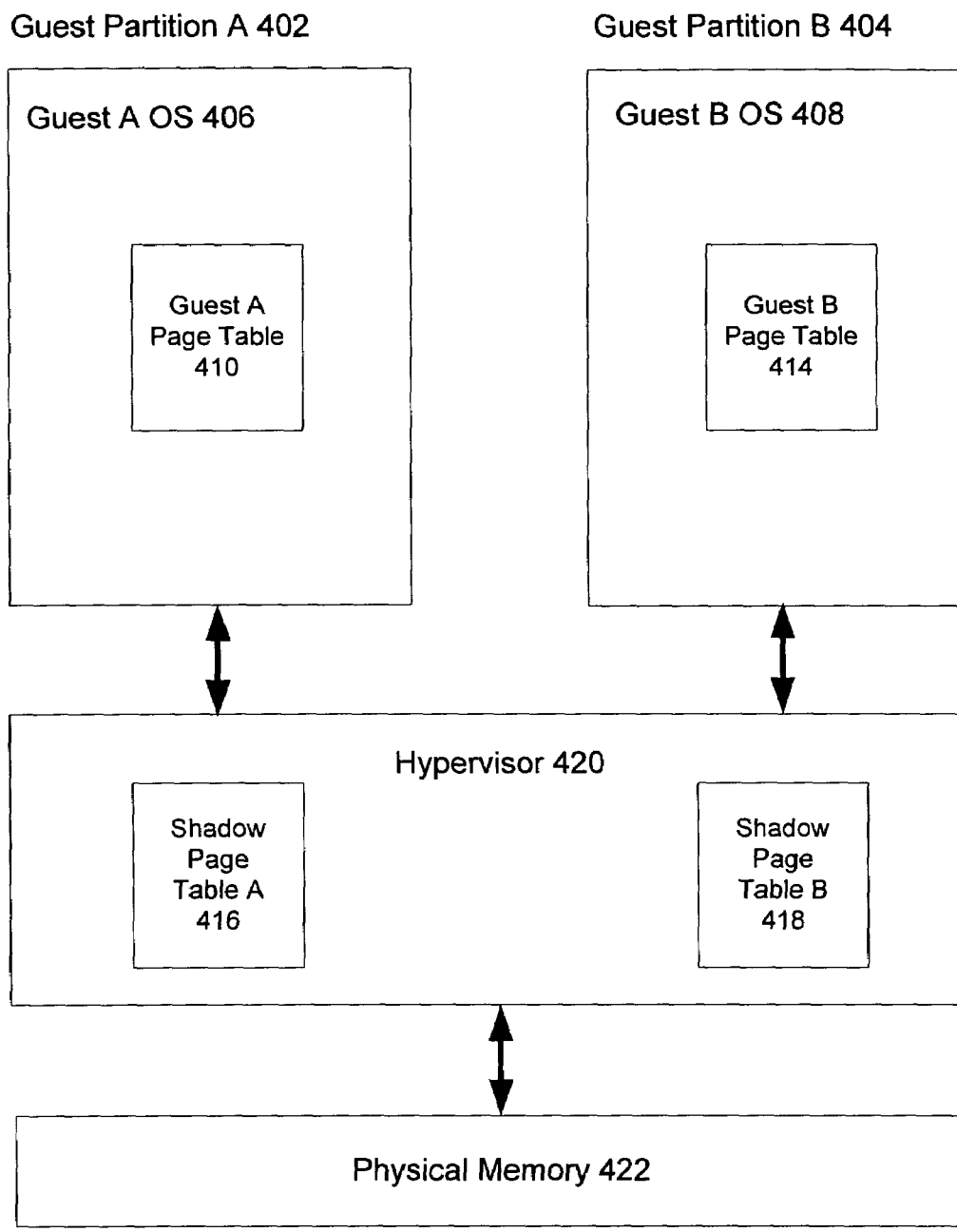
FIG. 4A illustrates general aspects of guest page tables and shadow page tables.

FIG. 4A depicts general aspects of exemplary shadow page tables. A guest partition A 402 and a guest partition B 404 are illustrated. Each of these partitions 402 and 404 have their own operating systems, namely, the guest A OS 406 and the guest B OS 408, respectively. These partitions are maintained and operatively coupled by a virtualizing program, such as a hypervisor 420. These partitions 402 and 404 also have their own guest (partition) page tables 410 and 414, respectively, which are page tables that the respective partition operating systems operate on. Moreover, the hypervisor 420 also maintains its own shadow page tables 416 and 418.

In such a hypervisor environment, physical memory 422 access is controlled by the hypervisor 420 instead of either of the partitions 402 and 404 running on top of the hypervisor 420. Moreover, the page tables 416 and 418 that the operating systems 406 and 408 operate on, respectively, are not the real pages tables that a physical machine uses. Instead, the physical memory 422 is accessed using the shadow page tables 416 and 418. Specifically, access to the page directory root is kept private to the hypervisor 420, and the operating system's 406 and 408 page directory root is virtualized (where the page directory root, on an x86 or x64 machine, for example, is understood to be the CR3 register). Thus, while the guest page tables 410 and 414 are operated on by their respective OSs 406 and 408 to access memory, for example, it is in fact the shadow page tables 416 and 418 that have access to the physical memory 422.

In one aspect of this invention, the shadow page tables 416 and 418 are notified when changes are made to the guest page tables 410 and 414. This is necessary because when the operating systems 406 and 408 modify their respective page table 410 and 414 entries, the shadow page tables 416 and 418 must also modify its shadow page table entries to correspond to the operating system's 406 and 408 modifications.

Figure 4B:
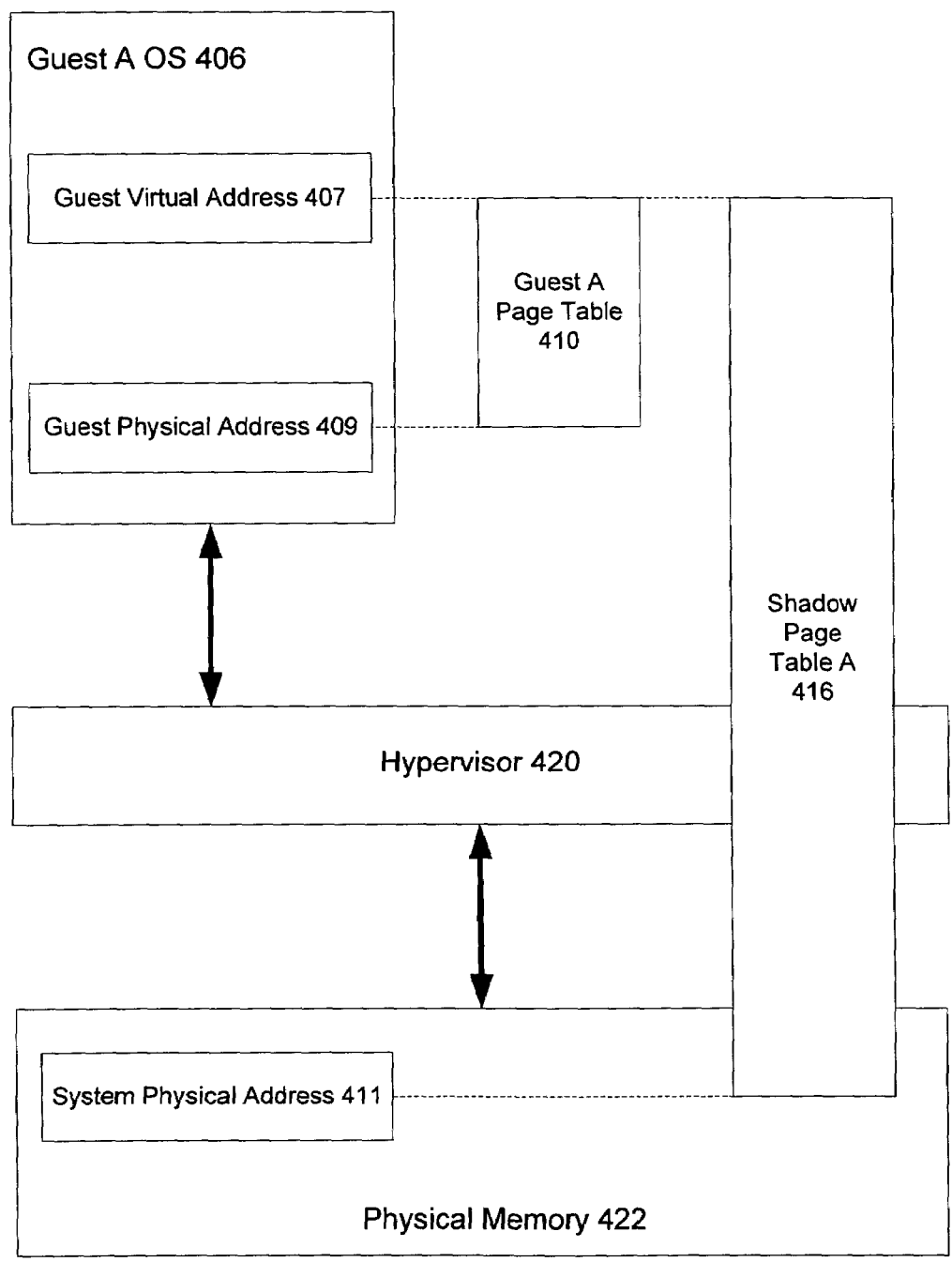
FIG. 4B illustrates the relationships of the guest page tables and shadow page tables to the various types of memories.

As used herein, as shown in FIG. 4B, a shadow page table is a table that maps guest (partition) virtual addresses 407 to system physical addresses 411. In contrast, guest page table 410 maps guest virtual addresses 407 to guest (partition) physical addresses 409. While the shadow page table maintains the "real" mappings of virtual address 407 to the "real" hardware physical memory 422, the guest page table 410 maintains the mappings of the guest virtual addresses 407 to virtualized guest physical addresses 409, that may be numbered from zero up to any designated value by the hypervisor 420 to make it seem like the guest A OS 406 is running on "real" hardware when in fact it is running on virtualized guest physical hardware 409. Thus, the guest physical addresses 409 can start at zero and go up to some number N, when in fact they really may start at some non-zero number in the physical memory 422, say, number M, and go up to some address number P in the physical memory 422.

In concrete terms, for example, in any given partition, a guest virtual address may start at address number 800 and may correspond to guest physical address number 0, and that number 0 address may really correspond to system physical address number 550. What the shadow page table accomplishes is a dual translation from the guest virtual address to the guest physical address (800→0) using the guest page table, and then using hypervisor internal data structures it can use the guest physical address to system physical address translations (0→550) to attain the net result of the translation from guest virtual address to the system physical address translations (800→550).

One illustrative example of the use of the shadow page table is in the form of a virtual tagged TLB, where the latter is implemented in order to reduce the high cost of switching an address space and the associated flushing of the shadow page table buffers that occurs with an address swap. In a traditional untagged TLB implementation, when a swap of an address space is performed, the entire TLB cache associated with the address space was discarded.

By contrast, in a tagged TLB, each TLB entry is tagged with an address space identifying which address space the TLB entry corresponds to. The cost of switching address space is thus reduced because the TLB entries are not necessarily purged from the TLB with an address switch. By implementing a virtual tagged TLB that associates a shadow page table with a specific address space, this aspect of the invention is able to achieve large performance improvements by not discarding the shadow page table when an address is swapped out.

Put another way, the tagged TLB remembers which address space a translation is associated with. Thus, address space 5 might have a virtual-to-physical translation of 800 to 5, whereas address space 7 might have a virtual-to-physical translation of 800 to 0. The tagged TLB remembers both address space translations and thus allows for the maintenance of two shadow page tables: one for address space 5 and another one for address space 7. Put more broadly, the tagged TLB implementation allows for the maintenance of multiple shadow page tables such that there can be a shadow page table per address space (although this one-to-one correspondence is not required, as is discussed below). The ability to maintain multiple shadow page tables means that they don't have to be discarded when an OS changes address spaces from one to another, or repopulated when the OS changes back to the original address space. The reason that shadow pages would have to be discarded at all is that upon address space switch, the guest page tables change and the shadow pages tables are based to an extent on these operating system page tables.

Figure 5:
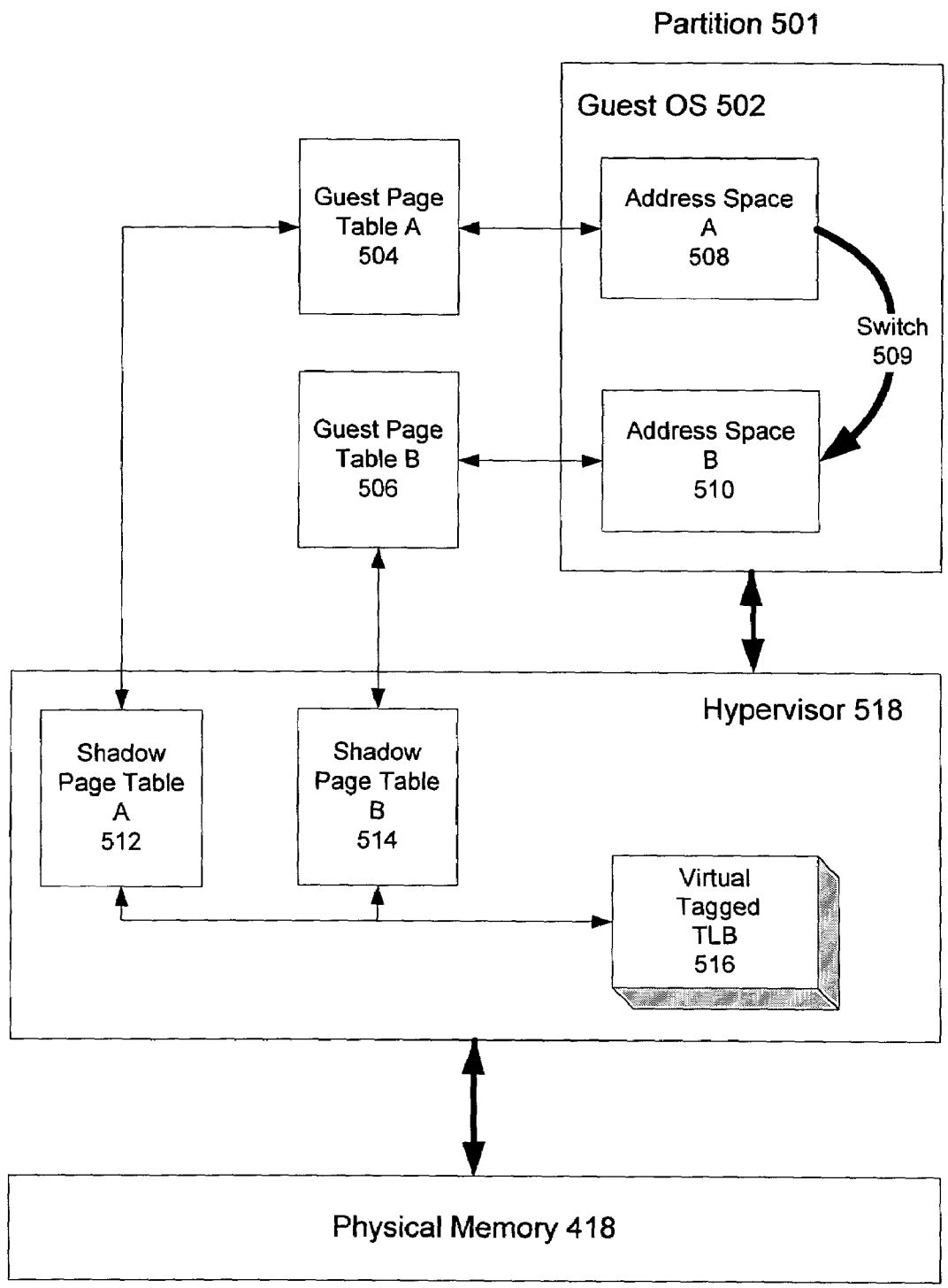
FIG. 5 explains the avoidance of the high cost of address switching.

FIG. 5 illustrates this aspect of the invention discussed directly above, and depicts the scenario of avoiding the high cost of address switching. A guest OS 502 is running in some partition 501, and there are two address spaces present: address space A 508 and address space B 510. There could be, for instance, some application like Word running in address space A 508 and some other application like Internet Explorer running in address space B 510. At some point, upon a switch of address spaces, the guest OS 502 could switch 509 from address space A 508 to address space B 510. This switch would entail switching guest page tables, from guest page table A 504 to guest page table B 506. Upon this switch 509, a simplistic approach would discard the current shadow page table and come up with a new shadow page table; and if there was ever a switch back to the original address space, namely, address space A 508, the shadow page table would have to be repopulated.

However, with the use of a virtual tagged TLB 516, a shadow page table can be maintained for every address space. As mentioned above, the virtual tagged TLB 516 associates shadow page tables with a specific address spaces. Thus, shadow page table A 515 is associated with address space A 508 (and its guest page table A 504), and shadow page table B 514 is associated with address space B 510 (and its guest page table B 506). This means that upon address space switches, shadow page tables don't have to be discarded; or upon switches back to original address spaces, shadow pages table don't have be repopulated. Maintaining such multiple shadow pages tables through a tagged virtual TLB, allows for the avoidance of the high cost of an address space switching.

One way to identify address spaces in the context of tagged TLBs, is to use the value of the CR3 register on an x86-based system, such as the IA32 architecture, which is just a pointer to a current page table. Thus, if the CR3 register is pointing to address 0×11000, for example, then that current address space would have an address space identifier (ASID) of 0×11000 (instead of 7). Likewise, if the CR3 register is pointing to address 0×99000, then 0×99000 is the ASID for the address space where the CR3 is pointing to. This aspect of the invention is based on the assumption that the CR3 register is unique for every address space because every address space has a unique page table. On other systems, such as PowerPC, an ASID may be explicitly provided for software.

In another aspect of the invention, the high cost of populating a new entry into the shadow page table is addressed. This problem is mitigated by batching the population of shadow page table entries from the guest page table. As was discussed above, the shadow page table has to be updated to reflect any changes in the guest page table. Specifically, when the hypervisor is notified that a new entry is needed in the shadow page table, instead of populating only a single shadow page table entry (PTE) for the page that caused a fault, the present implementation populates multiple entries. For each entry that is populated, one costly page fault into the hypervisor is potentially avoided.

Figure 6A:
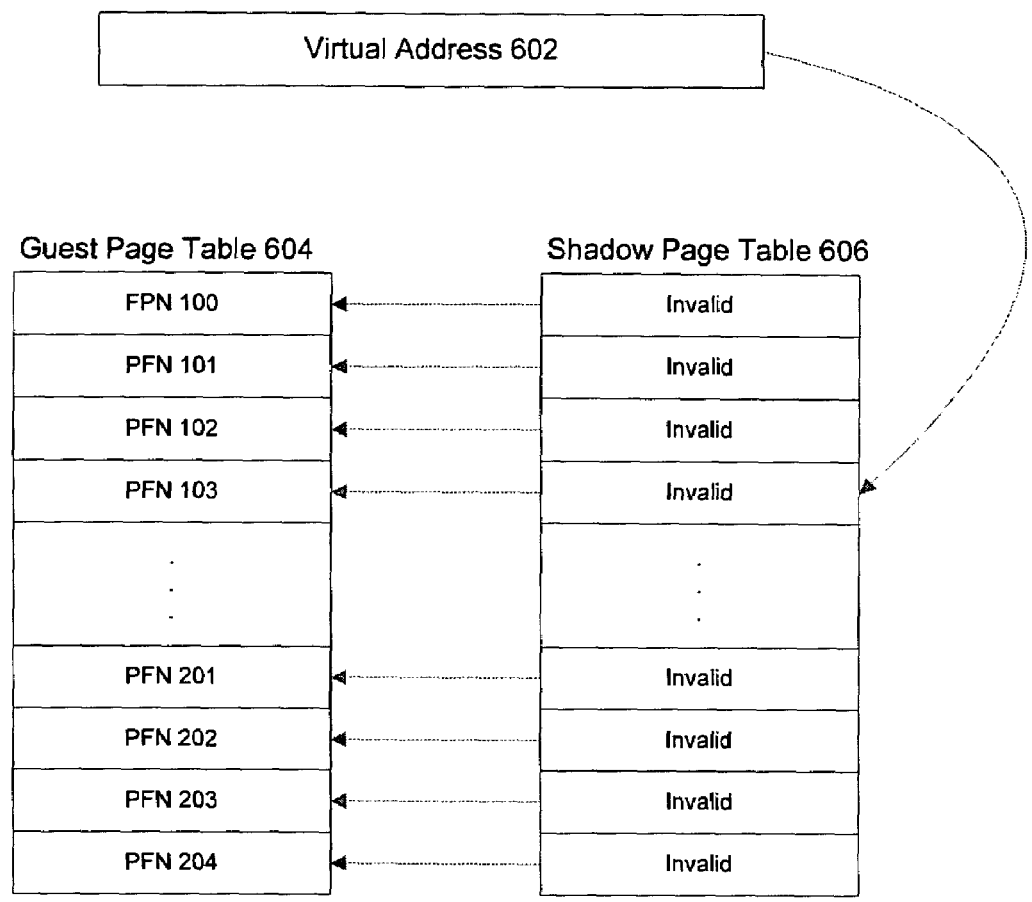
FIG. 6A illustrates an example shadow page table prior to processing a page fault.
Figure 6B:
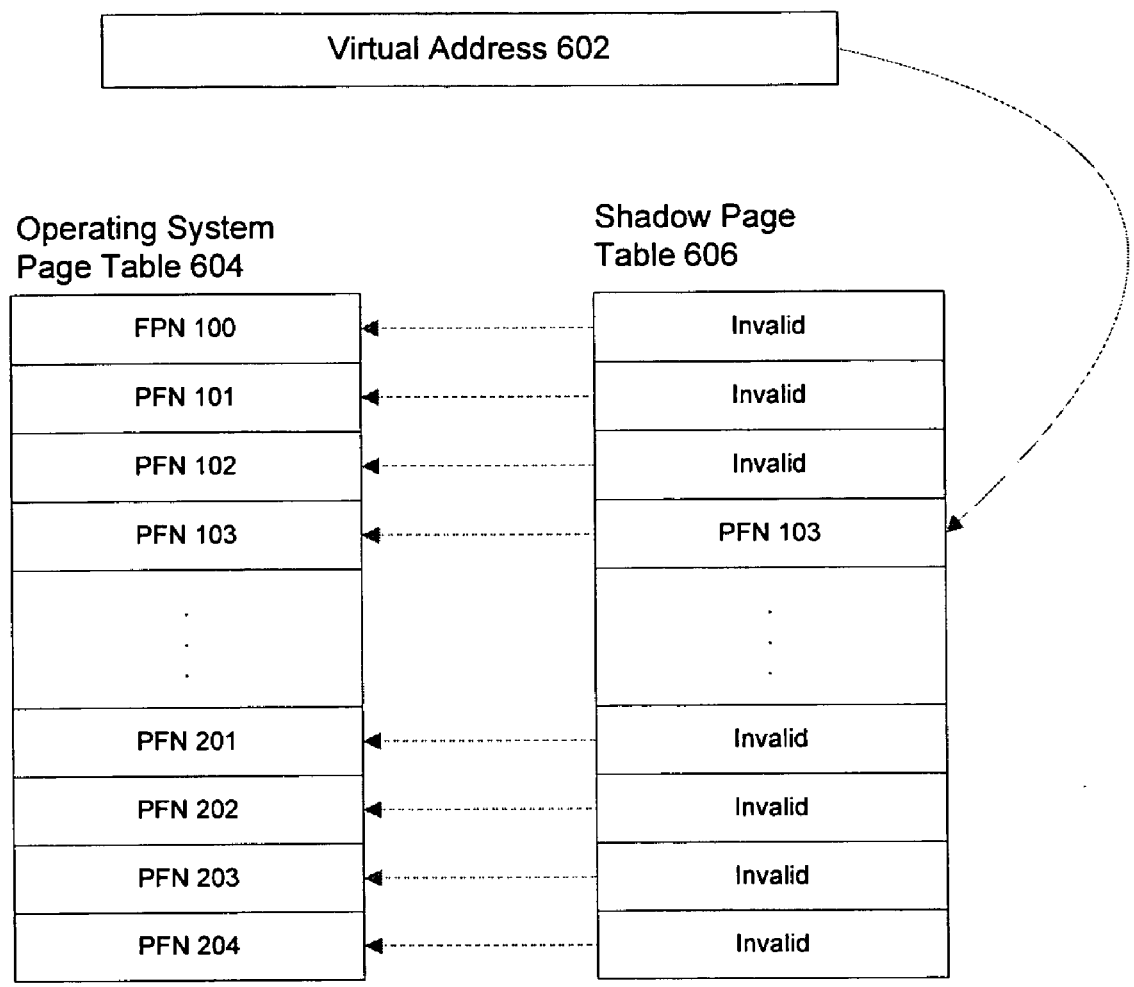
FIG. 6B illustrates an example shadow page table after processing a page fault when filling a single page.
Figure 6C:
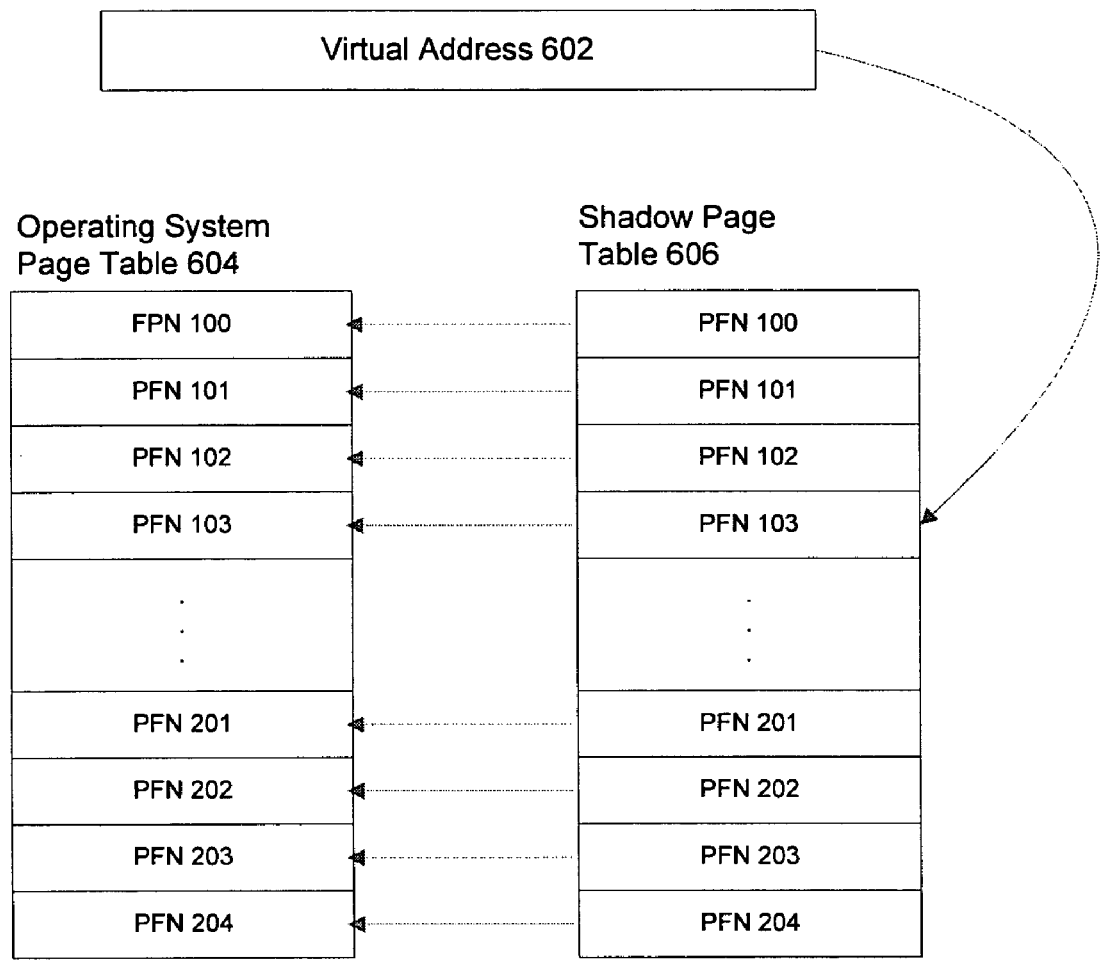
FIG. 6C illustrates an example shadow page table after processing a page fault by filling multiple pages.

FIGS. 6A and 6B examine the single page entry scenario, and FIG. 6C considers the batched population scenario presented by this aspect of the invention. Specifically, FIG. 6A presents a diagram of a guest page table 604 and its corresponding shadow page table 606. The shadow page table 606 in this example has no valid entries. Each shadow page table 606 entry points to a corresponding guest page 604 table entry.

Turning to FIG. 6B, in a system without batched shadow page table population, when a page fault interrupt is received by the hypervisor for the page that maps to physical page number (PFN) 103 in the guest page table 604, the processing of the interrupt will result in the shadow page table 606 in FIG. 6B with a corresponding PFN 103 entry.

Conversely, FIG. 6C depicts the result of using batched shadow page table population. With batched shadow page table population, instead of populating a single PTE within the shadow page table 606, multiple entries are populated, resulting in a shadow page table in FIG. 6C. In FIG. 6C, although the page fault interrupt was sent only for a single page, multiple pages within the shadow page table 606 were populated.

Next, since maintaining accessed and modified flags in a page table entry is quite expensive, to address this problem, another aspect of the invention supports the notion of lazy accessed and modified flag updating. When configured in this manner, the accessed and modified flags are not correctly maintained within the guest page tables. These flags are only updated in response to an explicit request from the operating system.

FIGS. 7A and 7B illustrate lazy accessed and modified flag propagation prior to a synchronization command and lazy accessed and modified flag propagation after a synchronization command, respectively. Thus, FIG. 7A provides a diagram that illustrates a guest page table 702 and a shadow page table 704 while executing with lazy accessed and modified flag propagation enabled prior to synchronizing the accessed and modified flags between the shadow page table 704 and the guest page table 702. In FIG. 7A, a checked box is used to denote that the accessed flag is set, where an accessed flag means that a page has been read from; and, an unchecked box is used to denote that the accessed flag is not set, where the page has not been read from. Likewise, a checked box is used to denote that the modified flag is set, where a modified flag means that a page has been written to; and, an unchecked box is used to denote that the modified flag is not set, where the page has not been written to.

In comparison to FIG. 7A, FIG. 7B illustrates the two page tables 702 and 704 after execution of the synchronization command. In FIG. 7B, all the accessed and modified flags within the shadow page table 704 have been synchronized to the guest page table 702. Thus, this example shows that eleven page fault interrupts have been avoided by propagating the accessed and modified flags in a lazy fashion. This can be seen by comparing FIGS. 7A to 7B and counting the unchecked entries in FIG. 7A of the guest page table 702 and comparing them to the entries of the guest page table 702 in FIG. 7B which are now checked. In short, by synchronizing these flags between the guest page table 702 and the shadow page table 704 all at once, in lazy fashion, i.e., when an operating system requests synchronization and not when each access or modification is made, many fault interrupts can be avoided making the overall system much more efficient.

Another aspect of the invention recognizes the fact that invalidation of a TLB entries on a multiprocessor system is a very expensive operation. One reason that this operation is expensive in a virtual machine environment is because TLB shoot down algorithms require multiple entries into the hypervisor per TLB invalidation request. Thus, in this aspect of the invention, the performance of TLB shoot down is improved by providing routines to perform TLB shoot down from within the hypervisor, thus reducing the number of hypervisor calls needed invalidate TLB entries. These routines allow for a single hypervisor call to flush the TLBs of all processors, instead of requiring the guest OS to manually flush the PTE once for each processor.

Figure 8A:
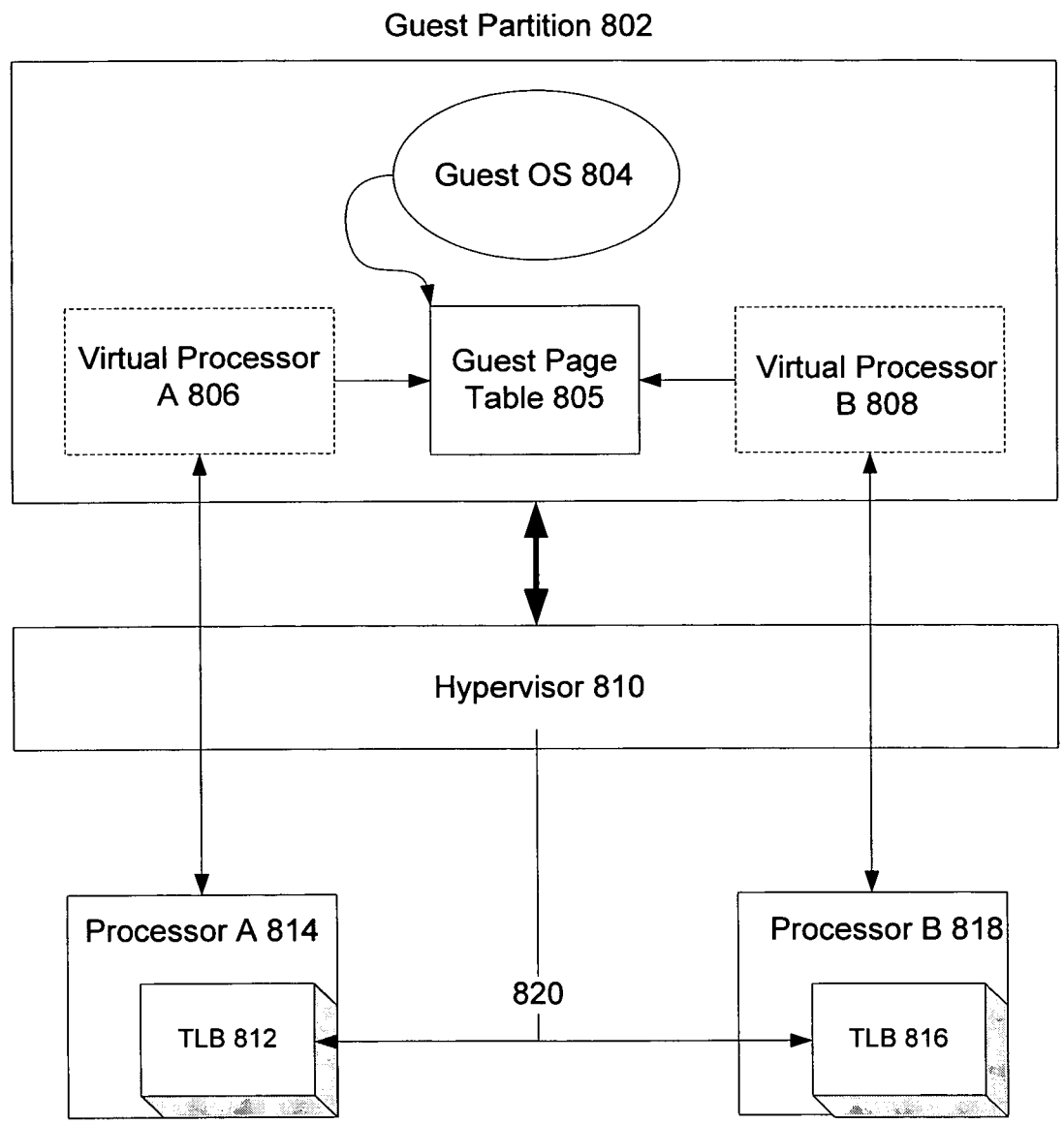
FIG. 8A illustrates cross-processor shoot down of physical TLBs.

FIG. 8A illustrates this cross-processor shoot down aspect of the invention. In FIG. 8A, a guest partition 802 contains a guest operating system 804. The guest operating system 804 can make changes in a guest page table 805. In the illustrated scenario, both of virtual processors, virtual processor A 806 and virtual processor B 808, which correspond to real processors A 814 and real processor B 818, respectively, happen to be pointing to the same guest page table 805. If the guest OS 804 makes a change in the guest page table 805, any cached TLB entries that are stored on the processor A 814 TLBs 812 and processor B 818 TLBs 816 must be changed accordingly, since these TLB entries must reflect the entries in the guest page table 805 (in its most general sense, a TLB is just a cache of page table entries). Put another way, certain entries in the TLBs may have to be shot down upon changes in guest page tables.

In order to perform an efficient shot down across multiple TLBs, the hypervisor can obtain from an enlightened OS (i.e. an OS that is aware it is running in a partition maintained by a hypervisor) requests to shoot down multiple such TLBs and perform such shoot down instead of the OS having to send inter-processor interrupts to processors that need to have their TLBs shot down. For example, if the guest OS 804 is running on virtual processor A 806, if it wanted to shoot down the TLB entries 816 in processor B 818, it would send an inter-processor interrupt to virtual processor B 808. If that virtual processor B 808 was actually scheduled to run on the real processor B 818, the hypervisor 810 would have to process that interrupt; if it was not scheduled it would have to wait an additional time for the virtual processor B 808 to be scheduled.

The typical TLB shoot down algorithm requires many transitions into the hypervisor 810 per a TLB shoot down request. By providing TLB invalidation routines, the hypervisor 410 may reduce the number of inter-processor interrupts. The routines allow for a single hypervisor flush 820 of the cashed page table entries in the TLBs 812 and 816 (instead of having the guest OS manually flush all of the TLBs). Moreover, if a virtual processor is not currently resident (i.e., not currently executing on any physical processor) and all the TLBs are invalidated, then when the virtual processor will be scheduled it will become unnecessary to explicitly invalidate any TLB entries corresponding to this virtual processor. The reason is that the TLBs of the corresponding physical processor will be automatically flushed when the virtual processor is eventually scheduled.

Figure 8B:
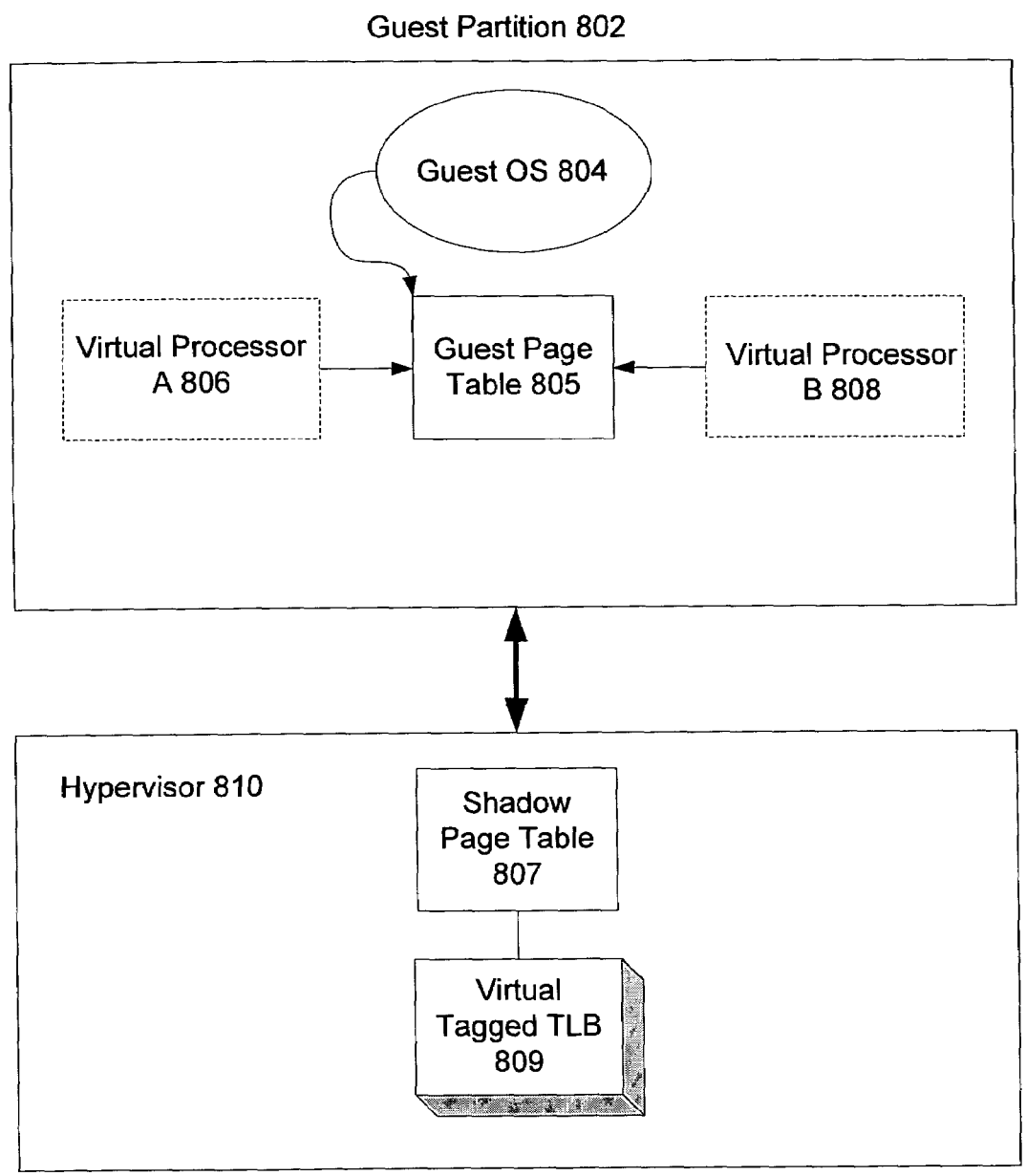
FIG. 8B illustrates cross-processor shoot down of Shadow Page Tables.

FIG. 8B depicts the same scenario as in FIG. 8A, except instead of TLB shoot down of TLBs on physical processors, shoot down of entries in virtual tagged TLBs is illustrated. Virtual tagged TLBs 809 are embodied in shadow page tables 807, and to the extent that entries are changed in guest page tables 805 they are changed in shadow page tables 807. Thus, just as in FIG. 8A, the hypervisor 810 allows for a single call to flush cached page table entries in shadow page tables. The shadow page tables 807 are invisible to the guest OSs, such as guest OS 804. The guest OS 804 interacts with the guest page tables, such as guest page table 805. However, to correctly maintain the mapping between virtual guest addresses and physical system addresses, shadow page tables 807 are updated upon a change in guest page tables, like guest page table 805.

On a somewhat related note regarding invalidation requests of TLB entries, in other aspects of the invention, the hypervisor provides the following advanced TLB abstractions within a hypervisor to improve the efficiency of a virtual machine environment: (1) invalidate a specific virtual-to-physical mapping; (2) invalidate a list of virtual-to-physical mappings; (3) invalidate a range of virtual-to-physical mappings; and (4) invalidate all virtual-to-physical mappings. Moreover, each of these operations may be performed either for a specific address space or for all address spaces within a partition. Additionally, each operation, as suggested above, may be performed on a list of processors described by the operation.

Figure 9A:
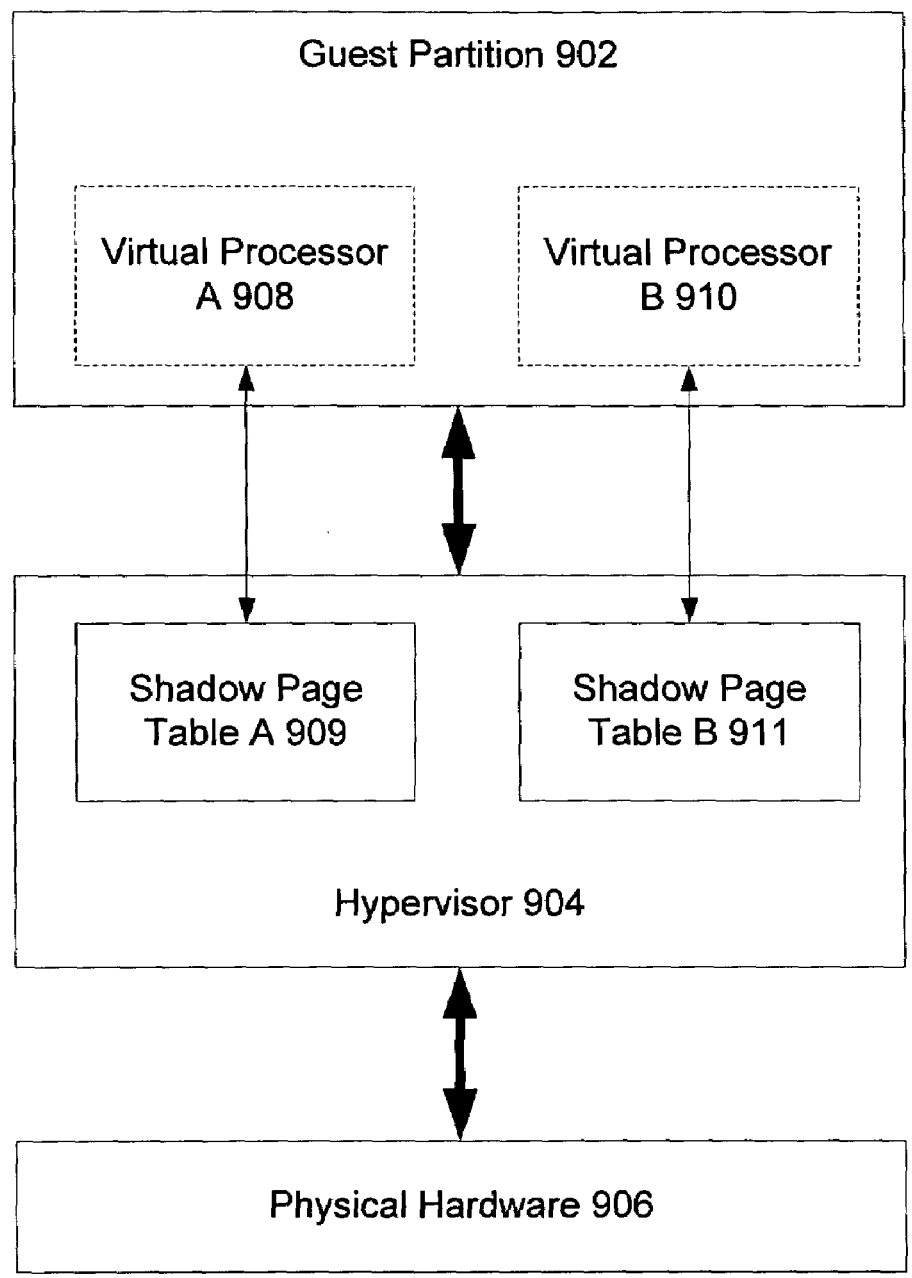
FIG. 9A illustrates a shadow page table per-virtual processor mode.

In yet other aspects of the invention, in FIG. 9A, in one operating mode, a per-virtual-processor shadow page table is utilized in order to avoid locking when editing a shadow page table. Thus, a virtual processor A 908 corresponds to a shadow page table A 909, and a virtual processor B 910 corresponds to a shadow page table B 911. Both virtual processors are located in a guest partition 902, which in turn is maintained by a hypervisor 904 virtualizing physical hardware 906 for the partition 902. In this model, each virtual processor has a separate shadow page table, even when a specific address space is being used on multiple virtual processors at the same time. When the shadow page table is allocated on a per-virtual-processor basis, it is not necessary to acquire synchronization locks while processing updates to the shadow page table.

Figure 9B:
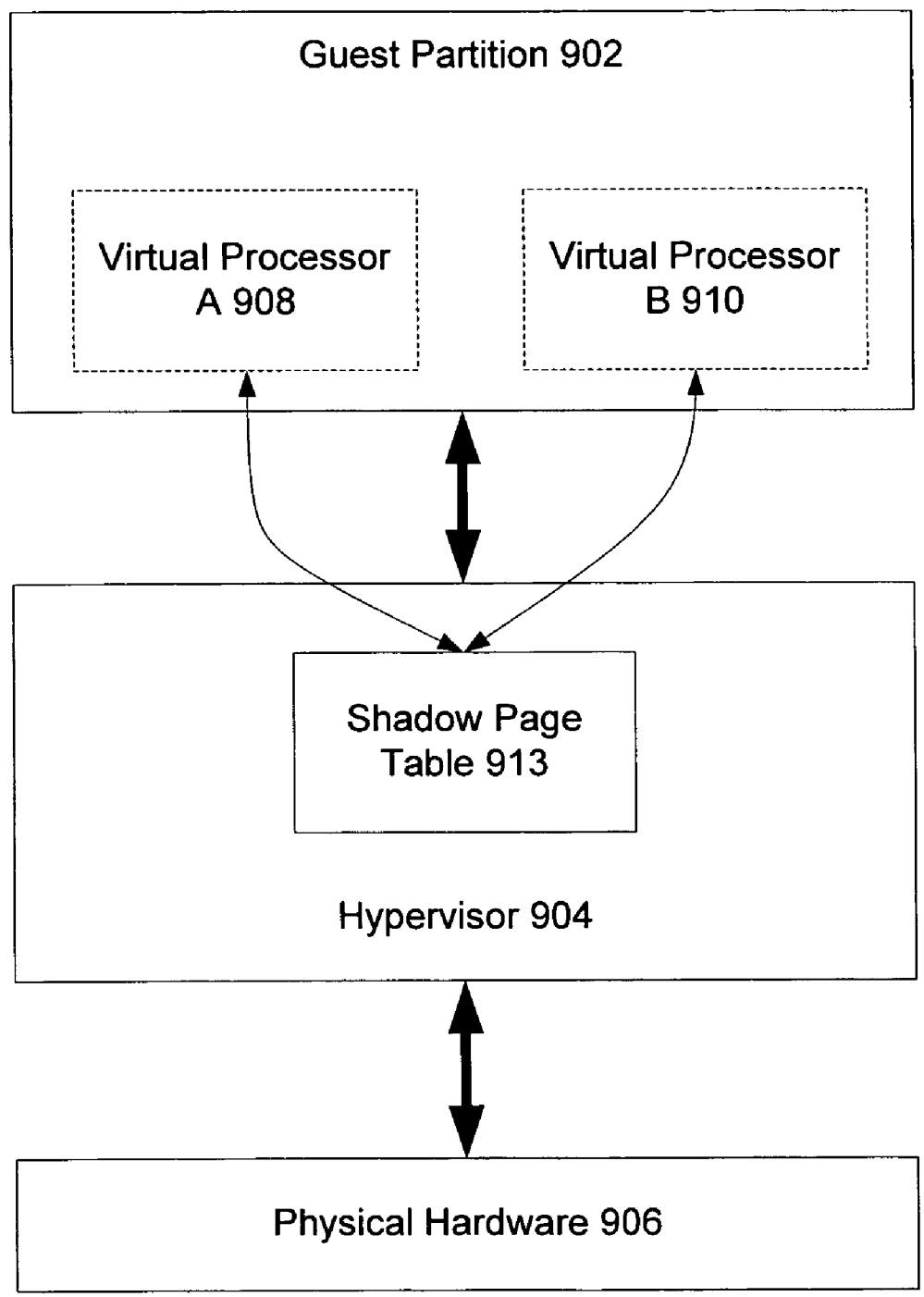
FIG. 9B illustrates a shadow page table per-partition mode.

In other aspects of the invention, in FIG. 9B, in a different operating mode, a per-virtual-machine shadow page table is utilized in order to allow for sharing between the same address space on two separate virtual processors and to minimize inter-processor interrupts during TLB shoot down. Thus, a virtual processor A 908 and a virtual processor B 910 both correspond to a shadow page table 913 maintained by the hypervisor 904, which in turn virtualizes physical hardware 906 for the guest partition 902. This mode saves memory by sharing the same or similar data (i.e. cached page table entries) between two virtual processors instead of maintaining separate instances of the data.

A particular virtual processor may dynamically switch between the first mode, illustrated in FIG. 9A, and the second mode, illustrated in FIG. 9B. Such switching depends on a host of external factors. One example includes the amount of memory that is consumed in the overall system on which the shadow page tables are running.

While the present invention has been described in connection with the preferred aspects, as illustrated in the various figures, it is understood that other similar aspects may be used or modifications and additions may be made to the described aspects for performing the same function of the present invention without deviating therefrom. For example, in certain aspects of the invention, shadow page table algorithms were discussed, where these algorithms allowed for more efficient switching of process areas within partitions, population of shadow page tables, synchronization of lazy flags between shadow page tables and system visible page tables, and cross-processor shoot down of TLB entries. However, other equivalent devices to this aspect of the invention are also contemplated by the teachings herein. Therefore, the present invention should not be limited to any single aspect, but rather construed in breadth and scope in accordance with the appended claims.

What is claimed:

1. A method for employing shadow page table algorithms in order to increase the efficiency of a virtual machine environment, comprising:

using a partition, a page table for mapping partition virtual addresses in the partition to partition physical addresses in the partition, and a virtualizing device, wherein the virtualizing device virtualizes system physical addresses into the partition physical addresses; and using a shadow page table maintained by the virtualizing device, wherein the shadow page table maps the partition virtual addresses to the system physical addresses, wherein the shadow page table is implemented in a virtual tagged translation lookaside buffer, wherein the virtual tagged translation lookaside buffer associates the shadow page table with an address space in the partition, wherein the address space is associated with the partition physical addresses.

2. The method according to claim 1, wherein the virtual tagged translation lookaside buffer associates an additional shadow page table with an additional address space, wherein upon a system switch from the address space to the additional address space, the virtual tagged translation lookaside buffer keeps track of the shadow page table.

3. The method according to claim 2, wherein upon a switch back from the additional address space to the address space, the system returns to the shadow page table, and wherein the virtual tagged translation lookaside buffer keeps track of the additional shadow page table.

4. The method according to claim 1, wherein the value of a pointer pointing to the shadow page table is used as the identifier of the address space, wherein the identifier is used by the virtual tagged translation lookaside buffer.

5. The method according to claim 1, wherein at least one of (a) a partition virtual address to a partition physical address mapping is invalidated, (b) a list of partition virtual addresses to partition physical addresses mappings is invalidated, (c) a range of partition virtual addresses to partition physical addresses is invalidated, and (d) all of the partition virtual addresses to the partition physical addresses are invalidated.

6. The method according to claim 1, wherein the virtual tagged translation lookaside buffer is associated with a virtual processor, wherein the virtual processor is virtualized by the virtualizing program, wherein the virtualizing program virtualizes a physical processor.

7. The method according to claim 6, wherein the physical processor lacks a physical tagged translation lookaside buffer.

8. The method according to claim 1, wherein the virtual tagged translation lookaside buffer is associated with a virtual processor, wherein the virtual processor is virtualized by the virtualizing program, and wherein an operating system selects via an interface between a processor with a tagged translation lookaside buffer and a processor with a non-tagged translation lookaside buffer.

9. The method according to claim 1, further comprising using a first virtual processor and a second virtual processor in the partition, using the shadow page table and an additional shadow page table, wherein in a first modality the shadow page table corresponds to the first virtual processor and the additional shadow page table corresponds to the second virtual processor, and wherein in a second modality the shadow page table corresponds to both the first virtual processor and the second virtual processor.

10. The method according to claim 9, wherein the system switches between the first modality and the second modality dynamically.

11. The method according to claim 9, wherein the system operates in the first modality when anticipating the editing of at least one of the shadow page table and the additional shadow page table, and wherein the system operates in the second modality when reducing inter-processor interrupts during a translation lookaside buffer shoot down.

12. The method according to claim 11, wherein the translation lookaside buffer shoot down entails shooting down the translation lookaside buffer corresponding to the first virtual processor and shooting down the translation lookaside buffer corresponding to the second virtual processor.

13. A method for batching shadow page table population in a virtual machine environment, comprising:
    using a partition page table with a first partition page table entry and a second partition page table entry; and
    using a shadow page table, wherein upon population of the first page table entry in the shadow page table, the second page table entry is also populated.

14. The method according to claim 13, wherein the first partition page table entry is populated in the shadow page table upon a fault caused in the partition page table entry.

15. The method according to claim 13, wherein the second partition page table entry avoids the need to be populated in the shadow page table.

16. A method for increasing the efficiency of page table entry shoot down across a plurality of processors, comprising:
    using a first processor and a second processor, wherein the first processor contains a first translation lookaside buffer, and wherein the second processor contains a second translation lookaside buffer; and
    using a virtualizing device for virtualizing the first processor and the second processor to a partition, wherein the virtualizing device is able to shoot down, in a single action, a page table entry in the first translation lookaside buffer and a page table entry in the second translation lookaside buffer upon a request to shoot down the page table entry in the first translation lookaside buffer.

17. The method according to claim 16, wherein the virtualizing device is able to shoot down the page table entry in the first translation lookaside buffer and the page table entry in the second translation lookaside buffer based on a request to modifty a page table entry in a partition page table located in the partition.

18. The method according to claim 17, further comprising a virtualized processor in the partition that is scheduled to run on the first processor, wherein the virtualized processor avoids the shoot down of the page table entry in the first translation lookaside buffer based on the virtualized processor being scheduled to run on the first processor.

19. The method according to claim 17, wherein the virtualizing device is able to shoot down a page table entry in a shadow page table associated with the partition page table.

20. The method according to claim 16, wherein the shadow page table is embodied as a virtual translation lookaside buffer, and wherein the virtual translation lookaside buffer is tagged.

* * * * *